(12) United States Patent
Cao et al.

(10) Patent No.: US 10,490,856 B2
(45) Date of Patent: Nov. 26, 2019

(54) FORMATION MACHINE FOR POLYMER LI-ION BATTERY WITH 64 CHANNELS

(71) Applicant: ZHEJIANG HANGKE TECHNOLOGIES CO., LTD, Hangzhou (CN)

(72) Inventors: Ji Cao, Hangzhou (CN); Zheng Cao, Hangzhou (CN); Wei Liu, Hangzhou (CN)

(73) Assignee: ZHEJIANG HANGKE TECHNOLOGIES CO., LTD, Hangzhou (CN)

( * ) Notice: Subject to any disclaimer, the term of this patent is extended or adjusted under 35 U.S.C. 154(b) by 185 days.

(21) Appl. No.: 15/559,747

(22) PCT Filed: Mar. 16, 2017

(86) PCT No.: PCT/CN2017/076915
§ 371 (c)(1),
(2) Date: Sep. 19, 2017

(87) PCT Pub. No.: WO2017/206568
PCT Pub. Date: Dec. 7, 2017

(65) Prior Publication Data
US 2018/0191023 A1 Jul. 5, 2018

(30) Foreign Application Priority Data

May 31, 2016 (CN) .................... 2016 2 0513101 U

(51) Int. Cl.
*H01M 10/058* (2010.01)
*H01M 10/052* (2010.01)

(52) U.S. Cl.
CPC ....... *H01M 10/058* (2013.01); *H01M 10/052* (2013.01)

(58) Field of Classification Search
CPC .... H01M 10/058; H01M 10/052; H01M 2/02; H01M 2/10
See application file for complete search history.

(56) References Cited

U.S. PATENT DOCUMENTS

| 3,432,901 A * | 3/1969 | Fanning ................. H01G 13/02 |
| | | 242/444.3 |
| 2006/0123622 A1* | 6/2006 | Guy ....................... B65H 18/10 |
| | | 29/700 |

(Continued)

FOREIGN PATENT DOCUMENTS

| CN | 202503076 U | 10/2012 |
| CN | 202977626 U | 6/2013 |

(Continued)

OTHER PUBLICATIONS

International Search Report in International Application No. PCT/CN2017/076915, filed Mar. 16, 2017.

*Primary Examiner* — Kenneth J Douyette
(74) *Attorney, Agent, or Firm* — Muncy, Geissler, Olds & Lowe. P.C.

(57) ABSTRACT

A 64-channel polymer lithium ion battery formation fixture machine is disclosed, comprising a machine frame, wherein, further comprising a pressure control device, a 64-channel laminate, a temperature control cabinet and a battery formation cabinet; the pressure control device is mounted on the machine frame, and the 64-channel laminate is mounted on the pressure control device; the 64-channel laminate comprises a heating plate, a fixture pressure plate, a temperature sensor, a connecting chain, a guide block, a silicon plate and a battery tab contact pin for clamping tab of the polymer lithium ion battery, a plurality of fixture pressure plates are arranged in parallel, and the polymer lithium ion battery is clamped between two fixture pressure plates; the heating plate is attached to the surface of the fixture pressure (Continued)

plate for clamping polymer lithium ion battery, and the silicon plate is attached to the surface opposite to the heating plate; the temperature sensor is mounted inside the fixture pressure plate, and the end of the fixture pressure plates are interconnected by the connecting chain. This utility model integrates the pressing, heating and formation in one fixture, reducing the transferring steps between processes.

13 Claims, 4 Drawing Sheets

(56) References Cited

U.S. PATENT DOCUMENTS

| | | | | |
|---|---|---|---|---|
| 2012/0084979 | A1* | 4/2012 | Viavattine | H01M 2/26 29/874 |
| 2014/0117141 | A1* | 5/2014 | Kim | H01M 10/0409 242/439.4 |

FOREIGN PATENT DOCUMENTS

| | | |
|---|---|---|
| CN | 105958123 A | 9/2016 |
| CN | 205790234 U | 12/2016 |

\* cited by examiner

FORMATION MACHINE FOR POLYMER LI-ION BATTERY WITH 64 CHANNELS

CROSS-REFERENCE TO RELATED APPLICATIONS

This application is the U.S. national stage application of International Patent Application No. PCT/CN2017/076915, filed Mar. 16, 2017, which claims priority to Chinese Application No. 201620513101.3, filed May 31, 2016, the disclosures of each of which are incorporated herein by reference in their entirety.

FIELD OF THE INVENTION

This utility model relates to a 64-channel polymer lithium-ion battery formation fixture machine. The 64 channels can improve the production efficiency of battery and reduce the costs of equipment; this machine has some groundbreaking features in the field of lithium battery automation equipment, to solve the existing problems of production technology and process of battery, enhance the efficiency of battery production, reduce the labor output and solve the bottleneck problem of automated production equipment.

BACKGROUND

For the existing battery production technology, the process of heating & pressing is separated with charge & discharge and formation, and both processes need a long period of time; moreover, the heating and pressing is proceeded under high temperature, which caused great inconvenience for manual operation. In addition, the battery body is in direct contact when handling manually, resulting in high NG rate of battery; besides, it is difficult to effectively control the uncertainty caused by human factors. Therefore, the automated equipment will perform better for this kind of repetitive action under the complex environment. The two processes integrate into one and achieve the automated operation is necessary. This equipment is a set of automated 64-channel polymer lithium-ion battery formation fixture machine specially developed for this work.

SUMMARY

In order to overcome the drawback of separating heating & pressing from charge & discharge and formation in the existing battery production technology, this utility model provides a 64-channel polymer lithium-ion battery formation fixture machine that integrates heating & pressing and charge & discharge and formation into one process. This utility model can achieve one-time loading, and the functions of heating, pressing, formation and recognition of NG battery can be completed in one device. This set of system is easy to operate, and also energy efficient that reduce losses, improve the battery production and lower production cost.

The technical solution for this utility model:

A 64-channel polymer lithium ion battery formation fixture machine, including a machine frame, a pressure control device, a 64-channel laminate, a temperature control cabinet and a battery formation cabinet; wherein, the pressure control device is mounted on the machine frame, and the 64-channel laminate is mounted on the pressure control device; the 64-channel laminate includes a heating plate, a fixture pressure plate, a temperature sensor, a connecting chain, a guide block, a silicon plate and a battery tab contact pin used for clamping tab of the polymer lithium ion battery. A plurality of fixture pressure plates are arranged in parallel, and the polymer lithium ion battery is held and fixed between two fixture pressure plates; the heating plate is attached to a surface of the fixture pressure plate for holding polymer lithium ion battery, and the silicon plate is attached to a surface opposite to the heating plate; the temperature sensor is mounted inside the fixture pressure plate, and ends of the fixture pressure plates are interconnected by the connecting chain.

The pressure control device includes a pressure detection and automatic adjustment unit and a power transmission unit, which are arranged at both sides of the machine frame respectively. The plurality of the fixture pressure plates are located between the pressure detection and automatic adjustment unit and the power transmission unit;

The pressure detection and automatic adjustment unit includes spring assembly, pressure supporting plate, first guide rod, pressure detection sensor connected with the pressure supporting plate and detection control program for reading data of the pressure detection sensor and adjusting the pressure in a real-time manner, the spring assembly is fixed between two pressure supporting plates, the pressure supporting plate is mounted on the first guide rod, and the pressure supporting plate moves horizontally along the longitudinal direction of the first guide rod;

The power transmission unit includes a servo motor, a speed reducer, a secondary gearbox, a ball screw set, a lead screw drive plate and a second guide rod, the lead screw drive plate being connected to the fixture pressure plate via the second guide rod, the lead screw drive plate being disposed in parallel with the fixture pressure plate, and the lead screw drive plate being able to move along a longitudinal direction of the second guide rod; the servo motor is connected to the speed reducer, the secondary gearbox is arranged symmetrically on both sides of the speed reducer, and the speed reducer is connected to the secondary gearbox in a drive way, the secondary gearbox is connected to a ball screw set, the ball screw set is connected to the lead screw drive plate, the ball screw set drives the lead screw drive plate to push the fixture pressure plate to move along the longitudinal direction of the second guide rod and press the fixture pressure plate under the action of the servo motor.

The secondary gearbox includes a main drive gear, a primary drive gear and a secondary drive gear connected to the speed reducer in a drive way, the main drive gear being engaged with the primary drive gear, the primary drive gear being engaged with the secondary drive gear, and the secondary drive gear being connected to a flat key of the ball screw set.

The ball screw set includes a screw holder, a ball nut and a ball screw, the ball nut being sheathed to the ball screw, and the ball screw being engaged with the ball nut; both sides of the ball screw are arranged on both sides of the machine frame respectively, one side of the ball screw is connected to a secondary drive gear key and the other is arranged on the machine frame by a ball screw holder.

The battery formation cabinet includes a printed circuit board, a printed circuit board linkage adjustment unit used for manually adjusting a height of the printed circuit board according to a battery size to match a height of the battery, a connecting lead, a charge and discharge formation box and an outer frame; the printed circuit board corresponds to the fixture pressure plate one by one and the printed circuit board matches with the battery tab contact pin, when a polymer lithium ion battery is placed between the fixture pressure plates for pressing, battery tabs are bonded to the printed circuit board; the connecting lead is to connect the printed circuit board with the charge and discharge formation box, and the outer frame is used for installing the charge and discharge formation box.

The printed circuit board linkage adjustment unit includes a manual screw rod, a sliding block, a regulating lever, a manual screw holder, a bevel gear and a gear linkage rod. A plurality of the printed circuit boards are connected by the regulating lever, the manual screw rod is mounted on both sides of the machine frame through the manual screw holder, and the manual screw rod is sheathed with the sliding block that moves up and down along the manual screw rod, and both sides of the regulating lever are fixedly connected with the sliding blocks on both sides of the machine frame; the bevel gear is installed at a lower end of the manual screw rod located at one side of the machine frame, and the manual screw rod on another side of the machine frame is engaged with the bevel gear via the gear linkage rod.

The charge and discharge formation box includes a sheet metal frame, a formation circuit board and a channel interface arranged on the sheet metal frame. The formation circuit board is connected to a power supply for electricity supply, the formation circuit board is connected to the printed circuit board through a channel interface and the connecting lead.

A battery supporting film used for supporting and storing polymer pouch type batteries is provided between two fixture pressure plates.

A guide block is installed at a top of the fixture pressure plate for guiding and rectifying polymer pouch type batteries.

In this utility model, the polymer lithium ion battery is placed between the fixture pressure plates for formation during the production process, and with a capacity of 64 batteries once. The pressure control device exerts pressure on 64-channel laminate, and automatically adjusts the pressure to the set requirements. The temperature control cabinet can control the temperature for each laminate respectively, and the battery formation cabinet can proceed charge and discharge formation on the polymer lithium ion battery after pressing and heating. This utility model can integrate the existing two processes into one set of equipment, to stabilize the battery formation; and pressure control device can automatically adjust the pressure to the set requirements. Each fixture pressure plate can implement real-time adjustment of temperature through the temperature controller, to make the temperature at the set value ±2° C.

Compared with prior technology, this utility model has the following advantages

1. The pressing, heating and formation are integrated into one fixture through the automated program, which reduced the transferring steps between processes, and the existing two processes are combined into one process, enhancing the production efficiency.

2. The manually single loading for battery hot pressing is changed to simultaneous loading and unloading of a set of batteries. 64 batteries could be in heating pressing and formation process simultaneously, and under the same environment condition, the pressure uniformity and thermal uniformity for each battery are guaranteed; by adjusting the pressure using the servo motor and ball screw in a real-time manner, the pressure accuracy and reliability have been effectively improved.

3. With the double-linkage adjustable printed circuit board structure, the machine is applicable to the production of a variety of batteries, reducing the customers' costs for replacing fixture due to replacement of battery.

4. The integrated battery formation cabinet is placed in the lower part of the fixture, with compact structure, saving space.

5. Integrated design is adopted. The process needs of battery manufacturers can be arbitrarily set up, to achieve automatic assembly line.

DETAILED DESCRIPTION

Figure 1:
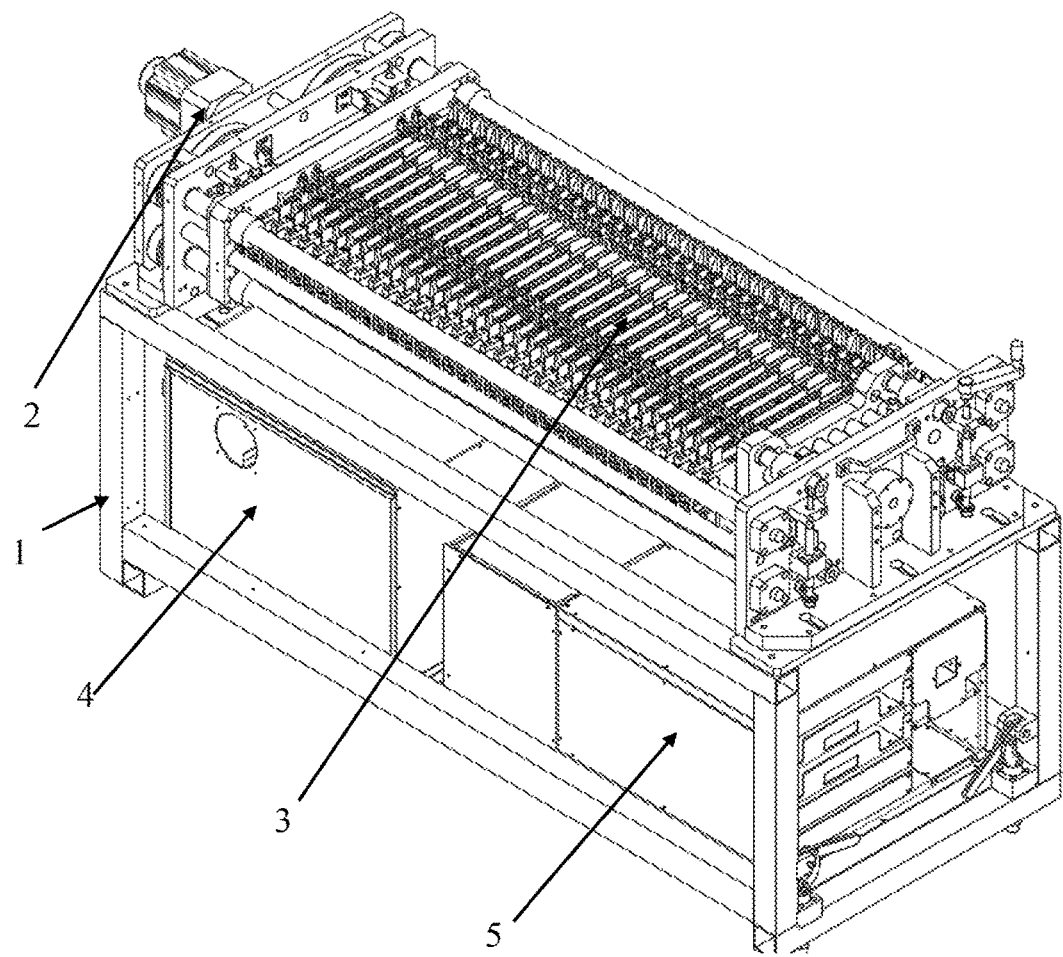
FIG. 1 is a structural diagram of the utility model.
Figure 2:
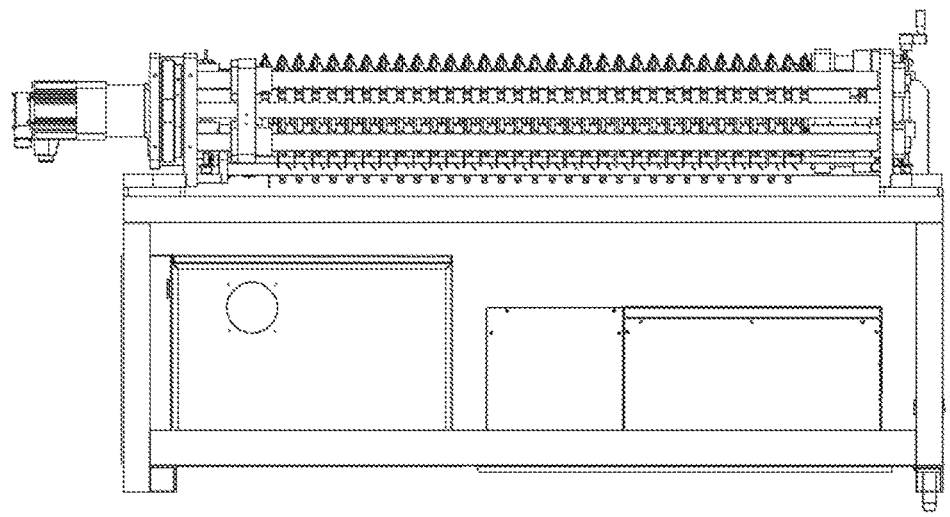
FIG. 2 is a front view of the utility model.
Figure 3:
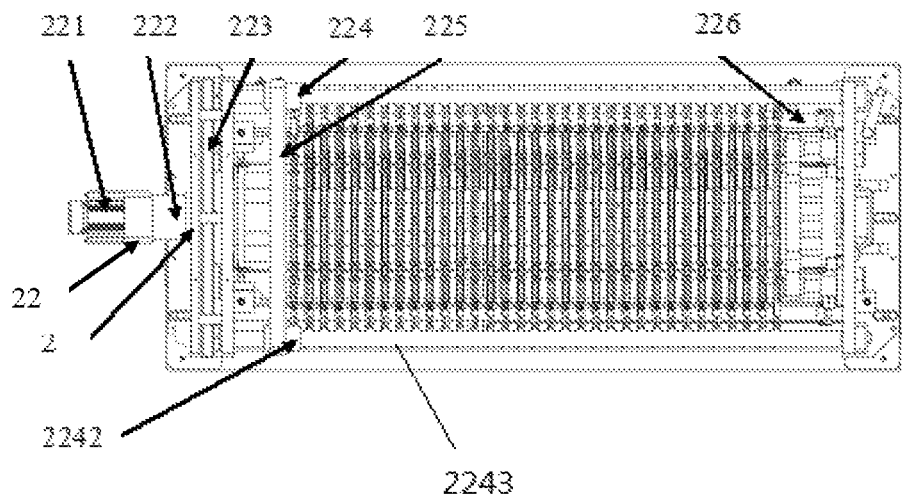
FIG. 3 is a top view of the utility model.
Figure 4:
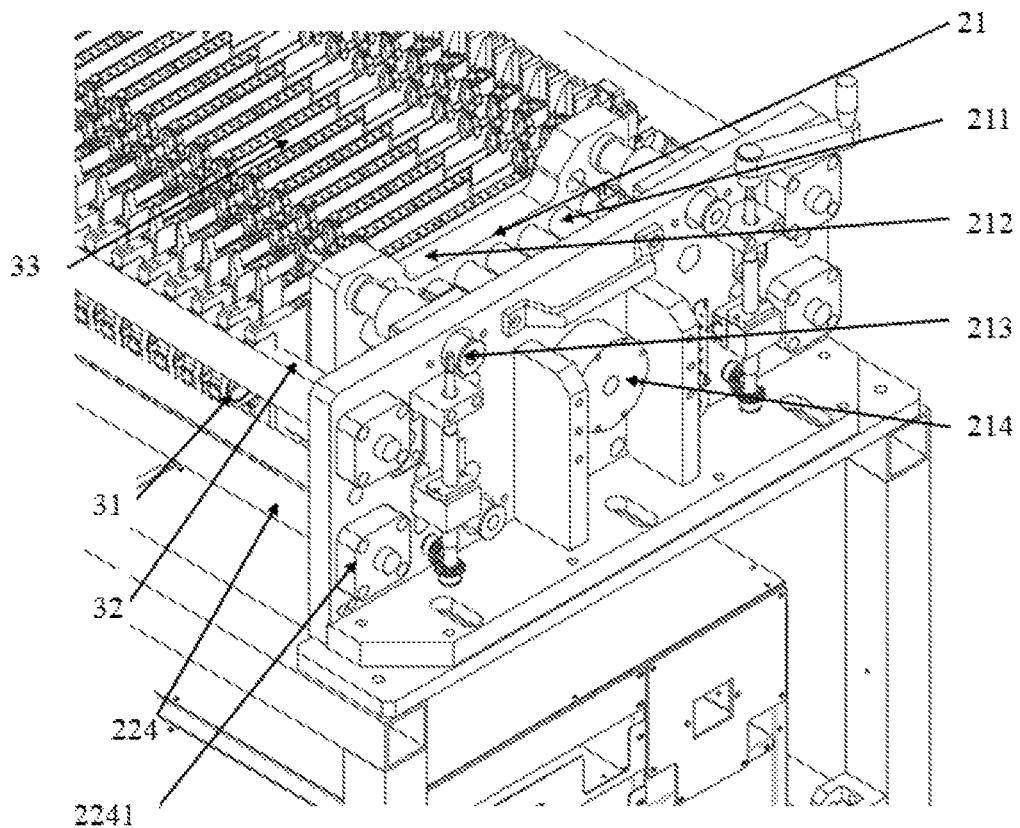
FIG. 4 is a pressure detection device in the utility model.
Figure 5:
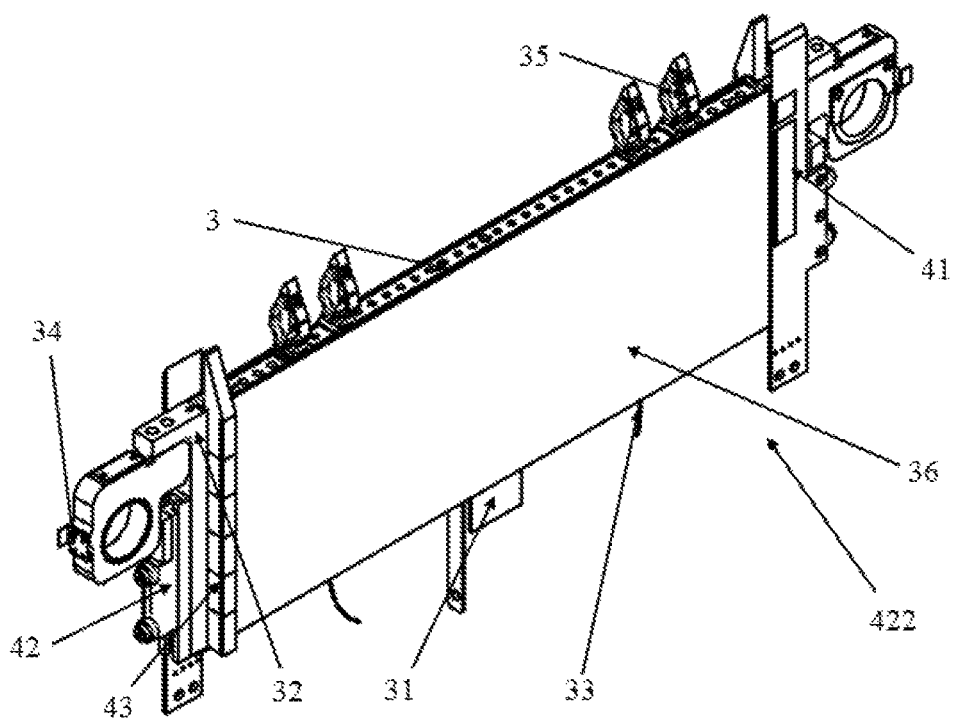
FIG. 5 is a schematic diagram of a fixture heating plate assembly.
Figure 6:
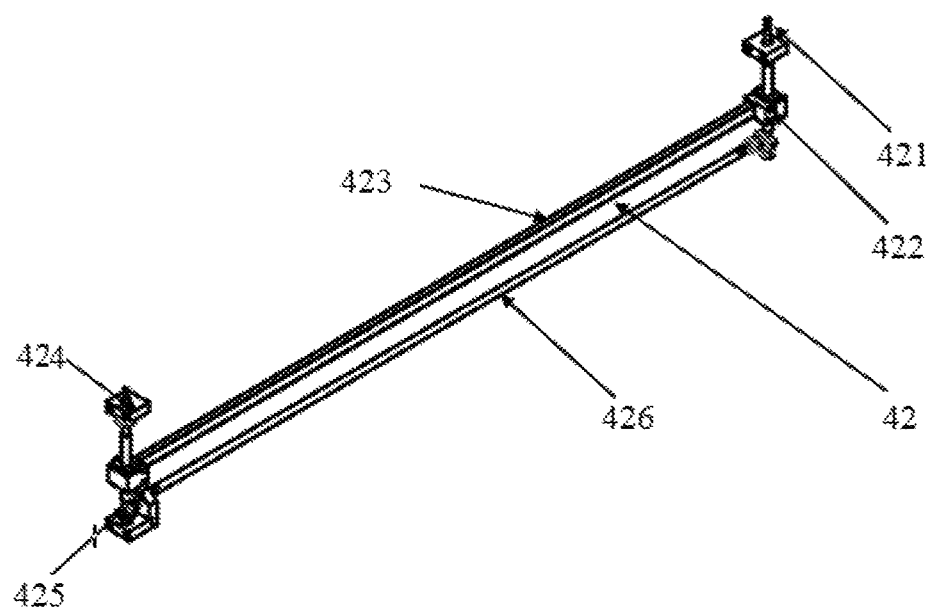
FIG. 6 is a linked PCB adjustment device.
Figure 7:
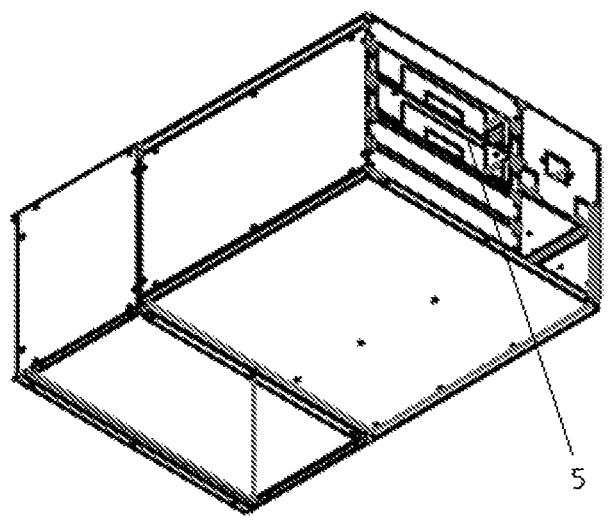
FIG. 7 is a battery formation cabinet in the utility model.
Figure 8:
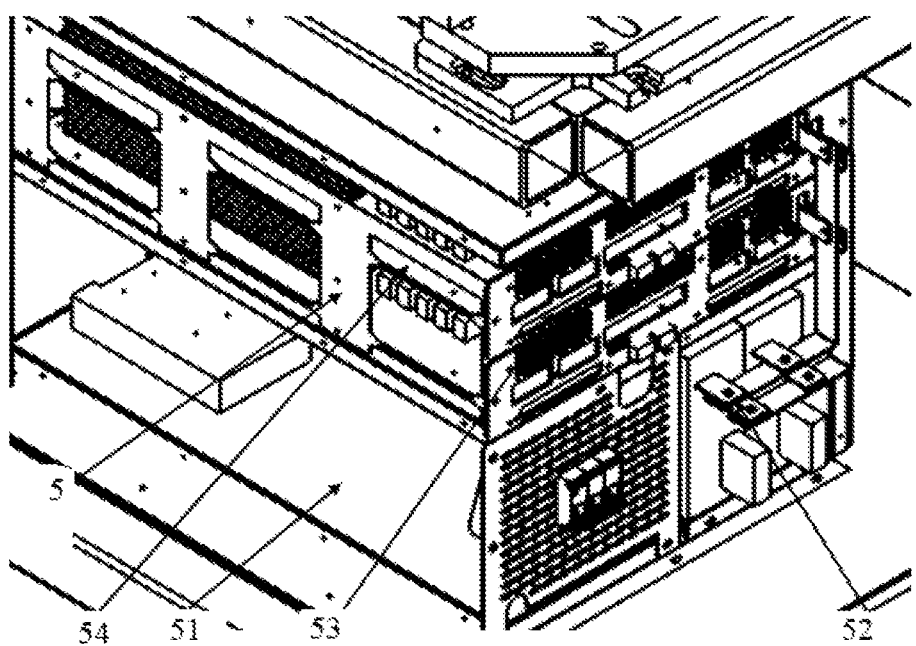
FIG. 8 is a schematic diagram of a battery formation cabinet in the utility model.

Referring to FIG. 1 to FIG. 8, a 64-channel 64-channel polymer lithium ion battery formation fixture machine, including a machine frame 1, a pressure control device 2, a 64-channel laminate 3, a temperature control cabinet and a battery formation cabinet 4; wherein, the pressure control device 2 is mounted on the machine frame 1, and the 64-channel laminate 3 is mounted on the pressure control device 2; the 64-channel laminate 3 includes a heating plate 31, a fixture pressure plate 32, a temperature sensor 33, a connecting chain 34, a guide block 35, a silicon plate 36 and a battery tab contact pin 43 for clamping tab of the polymer lithium ion battery. A plurality of fixture pressure plates 32 are arranged in parallel, and the polymer lithium ion battery is fixed between two fixture pressure plates; the heating plate 31 is attached to a surface of the fixture pressure plate 32 for clamping polymer lithium ion battery, and the silicon plate 36 is attached to a surface opposite to the heating plate 31; the temperature sensor 33 is mounted inside the fixture pressure plate 32, and ends of the fixture pressure plates 32 are interconnected by the connecting chain 34.

The pressure control device 2 includes a pressure detection and automatic adjustment unit 21 and a power transmission unit 22, which are arranged at both sides of the machine frame 1 respectively. The plurality of the fixture pressure plates 32 are located between the pressure detection and automatic adjustment unit and the power transmission unit;

The pressure detection and automatic adjustment unit 21 includes a spring assembly 211, a pressure supporting plate 212, a first guide rod 213, a pressure detection sensor 214 connected with the pressure supporting plate 212 and a detection control program for reading data of the pressure detection sensor 214 and adjusting the pressure in a real-time manner, the spring assembly 211 is fixed between two pressure supporting plates 212, the pressure supporting plate 212 is mounted on the first guide rod 213, and the pressure supporting plate 212 moves horizontally along the longitudinal direction of the first guide rod 213;

The power transmission unit 22 includes a servo motor 221, a speed reducer 222, a secondary gearbox 223, a ball screw set 224, a lead screw drive plate 225 and a second guide rod 226, the lead screw drive plate 225 being connected to the fixture pressure plate 32 via the second guide rod 226, the lead screw drive plate 225 being disposed in parallel with the fixture pressure plate 32, and the lead screw drive plate 225 being able to move along a longitudinal direction of the second guide rod 226; the servo motor 221 is connected to the speed reducer 222, the secondary gearbox 223 is arranged symmetrically on both sides of the speed reducer 222, and the speed reducer 222 is connected to the secondary gearbox 223 in a drive way, the secondary gearbox 223 is connected to a ball screw set 224, the ball screw set 224 is connected to the lead screw drive plate 225, the ball screw set 224 drives the lead screw drive plate 225 to push the fixture pressure plate 32 to move along the longitudinal direction of the second guide rod 226 and press the fixture pressure plate 32 under the action of the servo motor 226.

The secondary gearbox 223 includes a main drive gear, a primary drive gear and a secondary drive gear connected to the speed reducer in a drive way, the main drive gear being engaged with the primary drive gear, the primary drive gear being engaged with the secondary drive gear, and the secondary drive gear being connected to a flat key of the ball screw set 224.

The ball screw set 224 includes a screw holder 2241, a ball nut 2242 and a ball screw 2243, the ball nut 2242 being sheathed to the ball screw 2243, and the ball screw 2243 being engaged with the ball nut 2242; both sides of the ball screw 2243 are arranged on both sides of the machine frame respectively, one side of the ball screw 2243 is connected to a secondary drive gear key and the other is arranged on the machine frame 1 by a ball screw holder 2241.

The battery formation cabinet 4 includes a printed circuit board 41, a printed circuit board linkage adjustment unit 42 used for manually adjusting a height of the printed circuit board according to a battery size to match a height of the battery, a connecting lead, a charge and discharge formation box 5 and an outer frame; the printed circuit board 41 corresponds to the fixture pressure plate 32 one by one and the printed circuit board 41 matches with the battery tab contact pin 43, when a polymer lithium ion battery is placed between the fixture pressure plates 32 for pressing, battery tabs are bonded to the printed circuit board 41; the connecting lead is to connect the printed circuit board 41 with the charge and discharge formation box 5, and the outer frame is used for installing the charge and discharge formation box 5.

The printed circuit board linkage adjustment unit 42 includes a manual screw rod 421, a sliding block 422, a regulating lever 423, a manual screw holder 424, a bevel gear 425 and a gear linkage rod 426. A plurality of the printed circuit boards 41 are connected by the regulating lever 423, the manual screw rod 421 is mounted on both sides of the machine frame 1 trough the manual screw holder 424, and the manual screw rod 421 is sheathed with the sliding block 422 that moves up and down along the manual screw rod 421, and both sides of the regulating lever 423 are fixedly connected with the sliding blocks 422 on both sides of the machine frame 1; the bevel gear 425 is mounted at a lower end of the manual screw rod 421 located at one end of the machine frame 1, and the manual screw rod 421 on another side of the machine frame 1 is engaged with the bevel gear 425 via the gear linkage rod 426.

The charge and discharge formation box 5 includes a sheet metal frame 51, a formation circuit board 53 and a channel interface 54 arranged on the sheet metal frame. The formation circuit board 53 is connected to a power supply 52 for electricity supply, the formation circuit board 53 is connected to the printed circuit board 41 through a channel interface 54 and the connecting lead.

A battery supporting film used for supporting and storing polymer pouch type battery is provided between two fixture pressure plates 32.

A guide block 35 is installed at a top of the fixture pressure plate 32 for guiding and rectifying polymer pouch type battery.

In this utility model, the polymer lithium ion battery is placed between the fixture pressure plates for formation during the production process, and with a capacity of 64 batteries once. The pressure control device exerts pressure on 64-channel laminate 3, and automatically adjusts the pressure to the set requirements. The temperature control cabinet can control the temperature for each laminate respectively, and the battery formation cabinet can proceed charge and discharge formation on the polymer lithium ion battery after pressing and heating. This utility model can integrate the original two processes into one set of equipment, to stabilize the battery formation; and pressure control device can automatically adjust the pressure to the set requirements. Each fixture pressure plate can implement real-time adjustment of temperature through the temperature controller, to make the temperature at the set value ±2° C.

When using this fixture, after setting the battery production process, the technical parameters of the equipment will be adjusted. After equipment initialization, the 64-channel laminate 3 starts to heat the aluminum plate according to the set requirements, then the fixture is at the initial position. After manually adjusting the printed circuit board linkage adjustment unit 42 to the position at the height corresponding to the battery, loading is started. The battery is placed between 64-channel laminates 3 driven by pressure control device 2, after the battery is placed, the pressure control device 2 starts to press the battery, and when the pressure reaches the required range, the charge and discharge formation of battery is started. When all conditions are met, the equipment opens automatically to take out the battery, thus, a cycle is completed.

The contents of embodiment herein are merely illustrative of the form of implementation of the inventive concept. The scope of protection of the utility model should not be construed as limited to the specific forms set forth in the embodiment. The equivalent technical means that can be conceived by those skilled in the art according to this utility model also fall into the scope of protection of this utility model.

What is claimed is:

1. A 64-channel polymer lithium ion battery formation fixture machine, comprising a machine frame, a pressure control device, a 64-channel laminate, a temperature control cabinet and a battery formation cabinet; wherein the pressure control device is mounted on the machine frame, and the 64-channel laminate is mounted on the pressure control device; the 64-channel laminate comprises a heating plate, a fixture pressure plate, a temperature sensor, a connecting chain, a guide block, a silicon plate and a battery tab contact pin for clamping tab of the polymer lithium ion battery, a plurality of fixture pressure plates are arranged in parallel, and the polymer lithium ion battery is clamped between two fixture pressure plates; the heating plate is attached to a surface of the fixture pressure plate for clamping polymer lithium ion battery, and the silicon plate is attached to a surface opposite to the heating plate; the temperature sensor is mounted inside the fixture pressure plate, and ends of the fixture pressure plates are interconnected by the connecting chain.

2. The 64-channel polymer lithium ion battery formation fixture machine according to claim 1, wherein the pressure control device comprises a pressure detection and automatic adjustment unit and a power transmission unit, which are arranged at both sides of the machine frame respectively, the plurality of the fixture pressure plates are located between the pressure detection and automatic adjustment mechanism and the power transmission mechanism;

the pressure detection and automatic adjustment mechanism comprises a spring assembly, a pressure supporting plate, a first guide rod, a pressure detection sensor connected with the pressure supporting plate and a detection control program for reading data of the pressure detection sensor and adjusting the pressure in a real-time manner, the spring assembly is fixed between two pressure supporting plates, the pressure supporting plate is mounted on the first guide rod, and the pressure supporting plate moves horizontally along the longitudinal direction of the first guide rod;

the power transmission unit comprises a servo motor, a speed reducer, a secondary gearbox, a ball screw nut pair, a lead screw drive plate and a second guide rod, the lead screw drive plate being connected to the fixture pressure plate via the second guide rod, the lead screw drive plate being disposed in parallel with the fixture pressure plate, and the lead screw drive plate being able to move along a longitudinal direction of the second guide rod; the servo motor is connected to the speed reducer, the secondary gearbox is arranged symmetrically on both sides of the speed reducer, and the speed reducer is connected to the secondary gearbox in a drive way, the secondary gearbox is connected to a ball screw set, the ball screw set is connected to the lead screw drive plate, the ball screw set drives the lead screw drive plate to push the fixture pressure plate to move along the longitudinal direction of the second guide rod and press the fixture pressure plate under the action of the servo motor.

3. The 64-channel polymer lithium ion battery formation fixture machine according to claim 2, wherein the secondary gearbox comprises a main drive gear, a primary drive gear and a secondary drive gear connected to the speed reducer in a drive way, the main drive gear being engaged with the primary drive gear, the primary drive gear being engaged with the secondary drive gear, and the secondary drive gear being connected to a flat key of the ball screw set.

4. The 64-channel polymer lithium ion battery formation fixture machine according to claim 2, wherein the ball screw set comprises a screw holder, a ball nut and a ball screw, the ball nut being sheathed to the ball screw, and the ball screw being engaged with the ball nut; both sides of the ball screw are arranged on both sides of the machine frame respectively, one side of the ball screw is connected to a secondary drive gear key and the other end is arranged on the machine frame by a ball screw holder.

5. The 64-channel polymer lithium ion battery formation fixture machine according to claim 4, wherein the battery formation cabinet comprises a printed circuit board, a printed circuit board linkage adjustment unit used for manually adjusting a height of the printed circuit board according to a battery size to match a height of the battery, a connecting lead, a charge and discharge formation box and an outer frame; the printed circuit board corresponds to the fixture pressure plate one by one and the printed circuit board matches with the battery tab contact pin, when a polymer lithium ion battery is placed between the fixture pressure plates for pressing, battery tabs are bonded to the printed circuit board; the connecting lead is to connect the printed circuit board with the charge and discharge formation box, and the outer frame is to mount the charge and discharge formation box.

6. The 64-channel polymer lithium ion battery formation fixture machine according to claim 5, wherein the printed circuit board linkage adjustment unit comprises a manual screw rod, a sliding block, a regulating lever, a manual screw holder, a bevel gear and a gear linkage rod; a plurality of the printed circuit boards are connected by the regulating lever, the manual screw rod is mounted on both sides of the machine frame through the manual screw holder, and the manual screw rod is sheathed with the sliding block that moves up and down along the manual screw rod, and both ends of the regulating lever are fixedly connected with the sliding blocks on both ends of the machine frame; the bevel gear is mounted at a lower side of the manual screw rod located at one side of the machine frame, and the manual screw rod on another side of the machine frame is engaged with the bevel gear via the gear linkage rod.

7. The 64-channel polymer lithium ion battery formation fixture machine according to claim 6, wherein the charge and discharge formation box comprises a sheet metal frame, a formation circuit board and a channel interface arranged on the sheet metal frame, the formation circuit board is connected to a power supply for electricity supply, the formation circuit board is connected to the printed circuit board through the channel interface and the connecting lead.

8. The 64-channel polymer lithium ion battery formation fixture machine according to claim 7, wherein a guide block is installed at a top of the fixture pressure plate for guiding and rectifying polymer soft battery packs.

9. The 64-channel polymer lithium ion battery formation fixture machine according to claim 3, wherein the ball screw set comprises a screw holder, a ball nut and a ball screw, the ball nut being sheathed to the ball screw, and the ball screw being engaged with the ball nut; both sides of the ball screw are arranged on both sides of the machine frame respectively, one side of the ball screw is connected to a secondary drive gear key and the other end is arranged on the machine frame by a ball screw holder.

10. The 64-channel polymer lithium ion battery formation fixture machine according to claim 9, wherein the battery formation cabinet comprises a printed circuit board, a printed circuit board linkage adjustment unit used for manually adjusting a height of the printed circuit board according to a battery size to match a height of the battery, a connecting lead, a charge and discharge formation box and an outer frame; the printed circuit board corresponds to the fixture pressure plate one by one and the printed circuit board matches with the battery tab contact pin, when a polymer lithium ion battery is placed between the fixture pressure plates for pressing, battery tabs are bonded to the printed circuit board; the connecting lead is to connect the printed circuit board with the charge and discharge formation box, and the outer frame is to mount the charge and discharge formation box.

11. The 64-channel polymer lithium ion battery formation fixture machine according to claim 10, wherein the printed circuit board linkage adjustment unit comprises a manual screw rod, a sliding block, a regulating lever, a manual screw holder, a bevel gear and a gear linkage rod; a plurality of the printed circuit boards are connected by the regulating lever, the manual screw rod is mounted on both sides of the machine frame through the manual screw holder, and the manual screw rod is sheathed with the sliding block that moves up and down along the manual screw rod, and both ends of the regulating lever are fixedly connected with the sliding blocks on both ends of the machine frame; a bevel gear is mounted at a lower side of the manual screw rod located at one side of the machine frame, and the manual screw rod on another side of the machine frame is engaged with the bevel gear via the gear linkage rod.

12. The 64-channel polymer lithium ion battery formation fixture machine according to claim 11, wherein the charge and discharge formation box comprises a sheet metal frame, a formation circuit board and a channel interface arranged on the sheet metal frame, the formation circuit board is connected to a power supply for electricity supply, the formation circuit board is connected to the printed circuit board through the channel interface and the connecting lead.

13. The 64-channel polymer lithium ion battery formation fixture machine according to claim 12, wherein a guide block is installed at a top of the fixture pressure plate for guiding and rectifying polymer soft battery packs.

* * * * *